United States Patent [19]

Miaoulis et al.

[11] Patent Number: 4,991,644
[45] Date of Patent: Feb. 12, 1991

[54] ENGINE PREHEATING PROCESS AND SYSTEM

[75] Inventors: Ioannis N. Miaoulis, Stow; Maureen Selvidge, Belmont, both of Mass.

[73] Assignee: Tufts University, Medford, Mass.

[21] Appl. No.: 378,970

[22] Filed: Jul. 12, 1989

[51] Int. Cl.⁵ .......................... F01N 5/02; F02G 5/02; F02M 31/08
[52] U.S. Cl. ........................................ 165/52; 165/10; 165/41; 165/104.12; 123/41.14; 123/556; 123/553; 62/480; 62/238.3
[58] Field of Search ............... 165/104.12, 52, 10, 165/41; 123/41.14, 556, 553; 62/235.3, 480; 237/2 B

[56] References Cited
U.S. PATENT DOCUMENTS

| | | | |
|---|---|---|---|
| 2,287,172 | 6/1942 | Harrison et al. | 62/480 |
| 4,311,024 | 1/1982 | Itoh et al. | |
| 4,548,186 | 10/1985 | Yamaji | 123/556 |

FOREIGN PATENT DOCUMENTS

| | | | |
|---|---|---|---|
| 3113026 | 11/1982 | Fed. Rep. of Germany | 165/104.12 |
| 3504718 | 8/1986 | Fed. Rep. of Germany | 123/41.14 |
| 275820 | 11/1987 | Japan | 165/10 |

Primary Examiner—Albert W. Davis, Jr.
Attorney, Agent, or Firm—Nutter, McClennen & Fish

[57] ABSTRACT

A preheater system especially useful for diesel engine cold starts stores waste heat extracted from the engine exhaust flow in the form of chemical potential in a thermal storage material such as lithium bromide. The energy is retrieved during a cold start by direct hydration of that material to preheat engine intake air.

12 Claims, 3 Drawing Sheets

ENGINE PREHEATING PROCESS AND SYSTEM

This invention relates to engine preheating. It relates more particularly to a system and process for preheating an engine, especially a diesel engine, to facilitate starting the engine in cold weather.

BACKGROUND OF THE INVENTION

Diesel engines are increasingly being used in automobiles, trucks and heavy equipment because they are more rugged and efficient than their gasoline counterparts and have longer life expectancies. The diesel engine does, however, experience some problems which are not encountered in gasoline powered engines. One of these problems is the difficulty of starting a diesel engine in cold weather.

In a diesel engine, combustion takes place when air, compressed in the engine cylinders, reaches the ignition temperature of the diesel fuel. In warm weather, the intake air can easily reach the fuel ignition temperature when it is compressed. However, when a cold engine is started, some of the heat generated by the compression of the air in the cylinders is dissipated to the engine parts and this heat-sinking effect may result in the air not reaching the ignition temperature upon compression. Thus, at colder temperatures, especially below freezing, the heat produced by compression may not be able to overcome the heat-sinking effects of the cold engine. Indeed, it can be quite difficult, even impossible, to start a diesel engine in very cold weather conditions.

Many techniques for alleviating engine cold start problems have been proposed and developed. Essentially, in order to counter the heat-sinking effects of the cold engine parts, the engine must be supplied with additional heat from one source or another. Current engine cold start aids make use of three different sources of thermal energy. There are some preheater systems which convert electrical energy from the engine battery or an external outlet into thermal energy. Some known systems employ small fuel burners which draw fuel from the main tank in order to provide heat. Some preheaters produce heat by other forms of chemical burning. In all of these prior systems, the thermal energy produced is used to heat oil in the engine crankcase and/or engine intake air to assist the starting of the engine. However, they all have certain drawbacks which militate against their being considered the ultimate solution to the cold start problem.

The systems which derive their heat from a battery tend to drain the battery, which itself does not operate efficiently in cold weather. Also, in many cases, an external electrical source is not available. Those systems which produce heat by fuel or the burning of other chemicals can present a hazard when operating for long periods in a confined space because they generate poisonous or noxious fumes.

SUMMARY OF THE INVENTION

Accordingly, it is an object of this invention to provide an improved system to facilitate the starting of an engine in cold weather.

Another object of the invention is to provide a system of this type which does not require an external energy source to assist the starting of the engine.

Yet another object of the invention is to provide an engine cold start system which does not release additional noxious fumes into the environment when it is in operation.

A further object of the invention is to provide a system for preheating the intake air of an engine, particularly a diesel engine, to facilitate engine cold starts.

Still another object of the invention is to provide an engine preheating process which produces one or more of the above advantages.

Other objects will, in part, be obvious and will, in part, appear hereinafter.

The invention accordingly comprises the several steps and the relation of one or more of such steps with respect to each of the others, and the apparatus embodying the features of construction, combination of elements and arrangement of parts which are adapted to affect such steps, all as exemplified in the following detailed description, and the scope of the invention will be indicated in the claims.

Briefly, our preheater system uses waste thermal energy from the engine exhaust gases produced when the engine is running as a source of thermal energy. This thermal energy is stored in a special thermal storage material in the form of chemical potential by a direct dehydration/hydration process. The thermal energy is released during a cold start and used to warm the engine intake air before it reaches the engine cylinders. This thermal energy carried into the cylinders by the intake air helps to overcome the heat-sinking effects of the cold engine when the engine is cranked.

The storing of thermal energy in the form of a chemical potential produces many beneficial side effects. The system is completely self-contained and does not require an external energy source. Moreover, the energy can be stored in the thermal storage material at ambient temperature. Therefore, the preheater can be maintained in a ready-to-start condition for an indefinite period of time. For the same reason, no insulation is required to contain the thermal energy so that the preheater system can be quite compact. Further, as will be seen, the preheater is a completely closed system. Therefore, the operation of the system releases no fumes or noxious gases into the atmosphere that could present a hazard to personnel working in the vicinity of the associated engine. Finally, the system comprises, for the most part, standard sheet metal parts. Therefore, it is relatively inexpensive to make and to incorporate into present day vehicles and other heavy equipment.

BRIEF DESCRIPTION OF THE DRAWINGS

For a fuller understanding of the nature and objects of the invention, reference should be had to the following detailed description, taken in connection with the accompanying drawings, in which.

DESCRIPTION OF THE PREFERRED EMBODIMENT

Since the present system relies on the dehydration/hydration cycle to store thermal energy in the form of a chemical potential, a brief description of that phenomenon is in order. When hydrating certain materials, i.e. adding liquid water, considerable heat is released. In some cases, water molecules are adsorbed by the material and the heat of adsorption is released. In other cases, the water dissolves the material which, in turn, evolves heat in the form of heat of solution. The direct dehydration/hydration processes are reversible in that they form a cycle in which energy is alternately stored and released.

Figure 3:
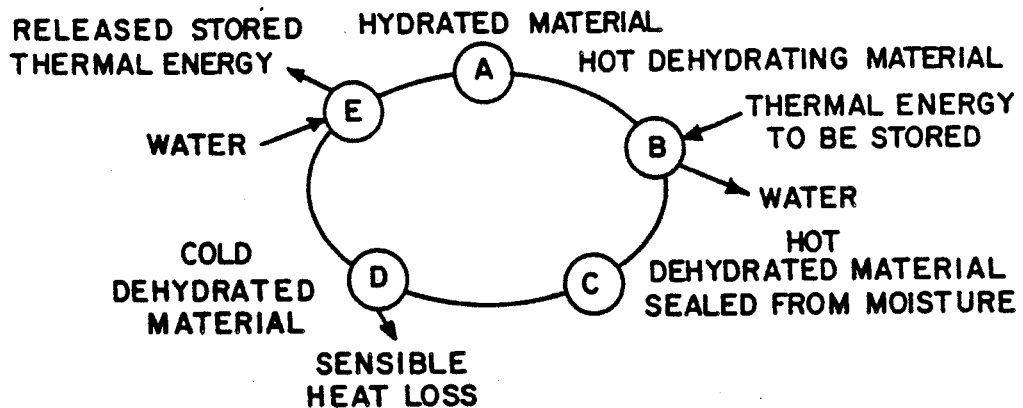

The full cycle of steps for thermal energy storage in this fashion is illustrated in FIG. 3. As shown there, the hydrated thermal storage material is present at stage A in the cycle. At stage B, the thermal energy to be stored is applied to that material to heat the material and drive off the water therein. This thermal energy is used to break the bonds between the molecules of the storage material and the wetting agent, i.e. the liquid water. In stage C, after the thermal storage material has been dehydrated and is still at an elevated temperature, it is sealed off from all water or moisture. The material eventually cools to ambient temperature giving up its sensible heat to the environment and may be stored indefinitely in stage D.

When it is desired to recover the stored thermal energy, it can be released from the thermal storage material in stage E simply by adding liquid water to the material to rehydrate the material. As soon as the water contacts the thermal storage material, the bonds between the water molecules and the molecules of the storage material are recreated. The formation of these bonds results in the conversion of chemical potential energy to thermal energy. The rehydrated storage material is now at stage A again and in condition to repeat the cycle. The storage material can be dehydrated and rehydrated repeatedly, each time storing and then releasing thermal energy.

One class of materials which will undergo a hydration-dehydration reaction, is adsorbents, including zeolites, silica gels, charcoals and activated aluminas. Each of these materials has a large internal surface area and the ability to trap and hold water by capillary action and physical adsorption. Physical adsorption or physiosorption is reversible adsorption by weak interaction only; no covalent bonds occur between the adsorbent, the thermal storage material in this case, and the adsorbate, i.e. the water. When water contacts any dehydrated adsorbant material, a bond forms due to a discontinuity in intramolecular or interatomic forces. The amount of heat evolved in the adsorption reaction depends upon the adsorbant and adsorbate and the strength of the bond formed. The weak bond between the adsorbant and the adsorbate can be broken only by the input of thermal energy.

A second class of materials that will undergo a reversible hydration process is salts. When a salt such as lithium chloride (LiCl) or lithium bromide (LiBr) is dissolved in water, it disassociates into its component ions. The polar water molecules are attracted to the salt's ions and form weak bonds with them. As a result of the formation of these bonds, heat is involved as heat of solution. The strength of these bonds and thus the amount of heat evolved by their formation depends upon the salt used. When the salt in solution is heated to a sufficiently high temperature, the water can be boiled off of the solution leaving the dehydrated salt.

The zeolites, salts, aluminas, charcoals and silica gels all have the ability to form a weak bond with water molecules which releases heat. In each case, the weak bond formed does not involve any rearrangement of atoms between molecules. The water can be extracted from each of these materials simply by heating them. Both of these classes of materials can undergo repeated FIG. 3 cycles of hydration and dehydration, and therefore are potential candidates for the thermal storage material in a preheater system that relies on reversible hydration.

We have found, however, that of all of these materials, only a very few have the requirements necessary for proper operation in this environment. These requirements include the following:
  reversibility—material should be able to be recycled repeatedly without changing its structure and experience a consistent temperature rise upon successive rehydrations;
  time/temperature profile for dehydration—material should be dehydrated completely at temperatures of 200° to 350° C. by the heat evolved by the engine exhaust gases in a reasonably short time, e.g. under 2 hours;
  thermal energy storage density—material should evolve sufficient thermal energy when rehydrated to raise engine intake temperature at least 30° to 45° C.;
  water penetration—to evolve thermal energy quickly during rehydration, there should be quick penetration of water into the material.

The thermal storage material which most satisfies the above requirements is lithium bromide (LiBr), although certain zeolites may be useful to a lesser extent in certain specific applications. These zeolites include the following:
  PQ-3A—molecular sieve, type 3A, potassium cation powder from PQ Corp.;
  PQ-13X—molecular sieve, type 13X cation 8-12 mesh bead from PQ Corp.;
  M-564—molecular sieve, type 3A, potassium cation, 8-12 mesh bead from Davidson, brand material distributed by Fisher Scientific Co., Fairlawn, N.J.;
  ZLD-4000—molecular sieve, type X, powder, from Union Carbide Corporation, Danbury, Conn.

Figure 1:
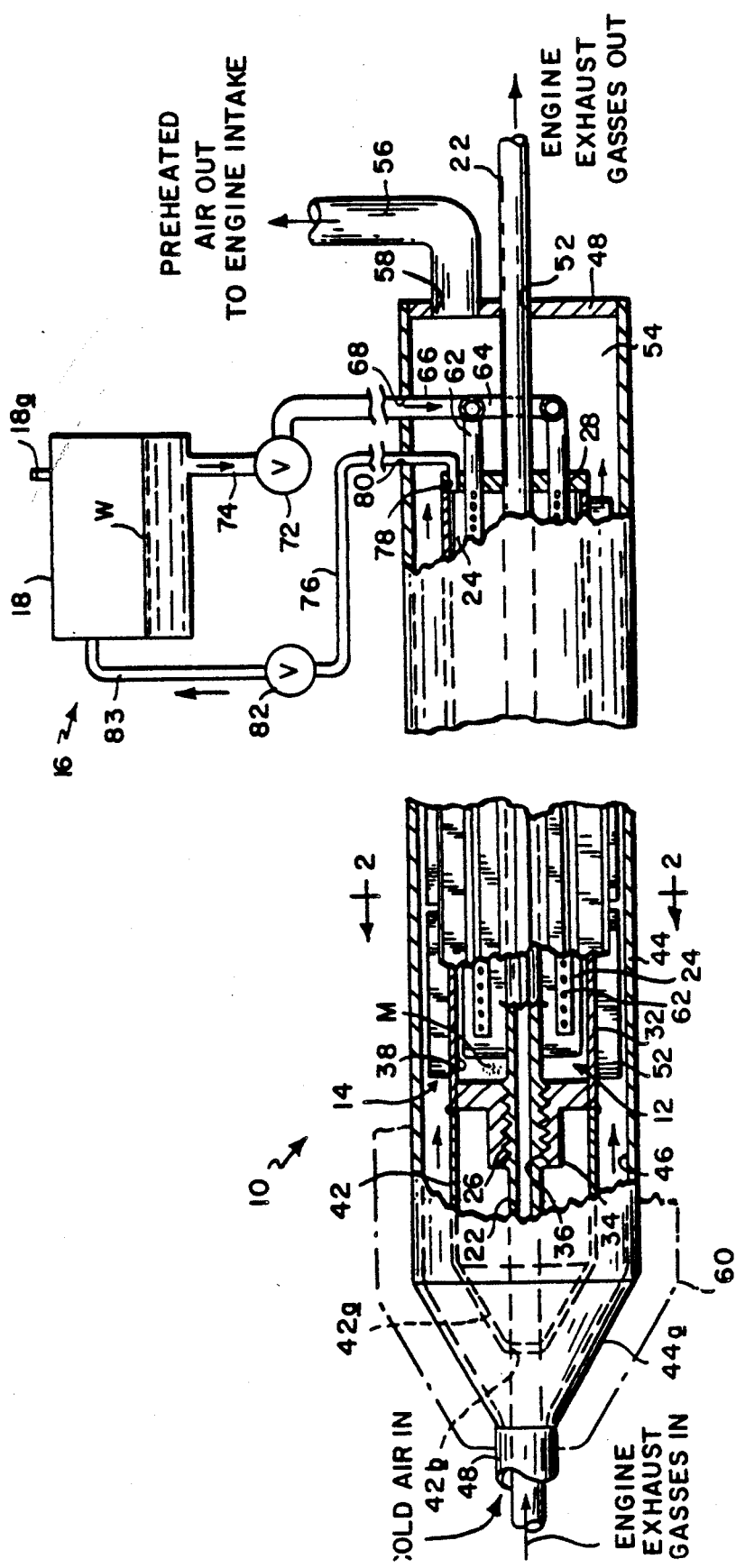
FIG. 1 is a view in elevation with parts broken away and other parts shown in diagrammatic form of a preheater system incorporating the invention.

Refer now to FIG. 1 of the drawings which shows our preheater system as it would be incorporated into a truck, bus or other piece of equipment powered by a diesel engine. It should be understood, however, that the preheater system could be used in other types of engines or, indeed, in other different applications to preheat a fluid of one kind or another.

As shown in FIG. 1, the system includes a preheater unit 10 which contains an exhaust stage heat exchanger shown generally at 12, which transfers thermal energy from the engine exhaust gases to the thermal storage material M in unit 10 for dehydrating that material, and an intake stage heat exchanger shown generally at 14 which transfers heat from the rehydrated storage material M to the engine intake air. There is also a water collection and storage section indicated generally at 16 which directs water from the thermal storage material to an elevated storage tank 18 during dehydration, stores the water and then subsequently releases the water back into the storage material M during rehydration and preheating.

Figure 2:
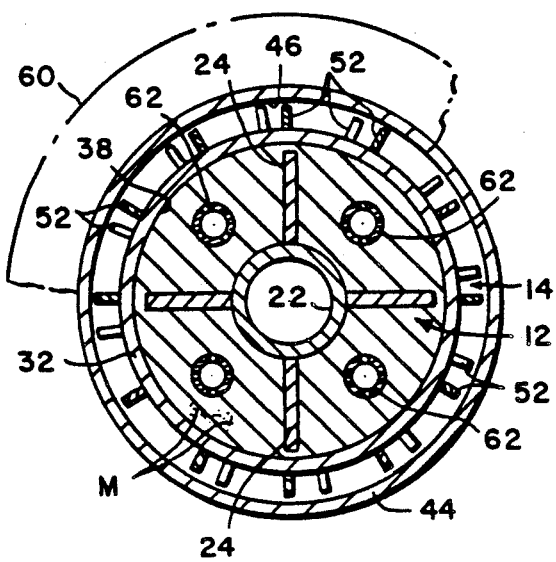
FIG. 2 is a sectional view along line 2—2 of FIG. 1.

As best seen in FIGS. 1 and 2, the exhaust stage heat exchanger 12 in preheater unit 10 includes a pipe 22 made of a corrosion-resistant, thermally conductive metal such as stainless steel which is connected to receive the exhaust gases of the engine being served by this system. That is, it is connected at its entrance end, i.e. the left end in FIG. 1, to the engines exhaust manifold. Hot engine exhaust gases enter the entrance end of the pipe 22 and leave through the opposite end thereof which is presumably connected to a standard muffler. Mounted on edge to an intermediate segment of pipe 22 is an array of longitudinal stainless steel fins 24. The illustrated system has four such fins spaced 90° apart around the pipe. Preferably, the fins are welded to pipe 22 so that the pipe and fins are in intimate heat exchange relationship. These fins are in the order of 13 inches long and 1 inch wide and have a thickness in the order of ⅛ inch.

A relatively short segment of pipe 22 spaced just beyond the left ends of fins 24 is provided with exterior threads 26. Also, a circular flange 28 is brazed coaxially to pipe 22 just beyond the right ends of those fins.

The finned segment of pipe 22 is received in an elongated 32 tube also made of a corrosion-resistant, thermally conductive metal such as stainless steel. The left or entrance end of tube 32 is provided with an end cap 34 which is press-fit into that end of the tube. End cap 34 has an axial passage 36 which is threaded to receive the threaded segment 26 of pipe 22. These parts are arranged so that when the pipe is threaded into passage 36 as shown in FIG. 1, the flange 28 abuts the exit or righthand end of tube 32 and constitutes an end cap that closes that end of the tube. If needed, a suitable heat-resistant gasket (not shown) may be provided between the tube end and flange 28 to provide a fluid-tight seal there.

Pipe 22, tube 32, flange 28 and end cap 34 define a chamber or compartment 38 which is fluid-tight an filled with thermal storage material M of the type described above, preferably lithium bromide (LiBr) in crystal powder form. Chamber 38 is able to accommodate approximately one kilogram of storage material M, with the fins 24 maximizing the thermal contact with the storage material.

A tubular baffle 42 having the same maximum diameter as tube 32 is welded or brazed to the entrance end of tube 32 The entrance end segment 42a of baffle 42 is conical in shape, tapering toward tube 22, with the tube passing snugly through an axial opening 42b in that member.

Still referring to FIGS. 1 and 2, tube 32 and its contents are received in a tubular housing 44 made of a corrosion-resistant material such as stainless steel. Housing 44 is longer and larger in diameter than tube 32 so that an annular passageway 46 exists between the tube and the housing. Housing 44 has an entrance end segment 44a which is conical or tapered at more or less the same angle as the baffle 42a. The left or entrance end of housing segment 44a is butt-welded or brazed to an adjacent end of a relatively large diameter pipe 48 arranged coaxially on pipe 22 with the annular space between the two pipes providing a path for intake air into passage 46. The baffle 42a and the housing segment 44a help to change the cross section of the intake air entering preheater unit 10 from circular to annular to minimize eddies in the air flow at the entrance end of preheater unit 10.

The outer surface of the thermally conductive tube 32 comprises the intake stage heat exchanger 14 which transfers heat between the storage material M inside chamber 38 and the cold intake air conducted into passage 46 via pipe 48. To increase the heat exchange efficiency between the storage material and the intake air, axial fins 52 of stainless steel are brazed or welded on edge to the outside surface of the stainless steel tube 32, with the fins extending substantially the entire length of that tube. Preferably, the fins are divided lengthwise into a plurality of lengthwise segments or sections with the fin segments or sections being staggered as shown in FIG. 2 to promote turbulence in the intake air flowing along passage 46.

The exit or right end of housing 44 is closed by an end cap 48 pressfit into that end of the housing, an axial clearance hole 52 being provided for pipe 22 in end cap 48. The space inside housing 44 between flange 28 and housing end cap 48 forms a plenum 54 for collecting and mixing the heated intake air leaving annular passageway 46. This hot air is conducted out of plenum 54 by a pipe 56 having one end brazed or welded to an open port 58 in end cap 48. The opposite end of pipe 56 is connected to the air intake port of the engine being served by this system. If desired, the outer surface of housing 44, including its entrance segment 44a, may be covered by a thermally insulating sheath 60 as shown in phantom in FIGS. 1 and 2. Sheath 60 not only protects heat exchanger apparatus 10 from corrosion and damage due to external sources, it also helps to maximize the heat exchange efficiency of the apparatus.

Still referring to FIGS. 1 and 2, the water collection and storage section 16 of the present system includes, in addition to water tank 18 elevated above preheater unit 10, a plurality of, herein four, perforated pipes 62 which extend substantially the entire length of chamber 38 between the fins 24 therein, the pipes exiting that chamber through flange 28 as shown in FIG. 1. The exit ends of pipes 62 connect via a circular manifold 64 in plenum 54 to a pipe 66 which extends out through a hole 68 in the wall of housing 44. The outer end of pipe 66 is connected by way of an on/off valve 72 to a pipe 74 leading from the bottom of tank 18. Although valve 72 could be a manual valve, in most applications it is an electrically operated solenoid valve controllable automatically or by the operator of the vehicle or other piece of equipment in which this system is installed.

Water collection and storage section 16 also includes a pipe 76 having one end connected to the top of chamber 38 through a hole 78 in flange 28. Pipe 76 extends out of housing 44 through a hole 80 in the wall thereof and is connected by way of a second solenoid operated on/off valve 82 a to pipe 83 leading to the top of tank 18.

Chamber 38 in tube 32 and the components of the water collection system 16 including pipes 62 and 76, water tank 18 and all of the pipes and fittings connecting those parts comprise a completely closed fluid-tight system for the circulation of fluid either as a liquid or as a gas or vapor between the storage material M in chamber 38 and tank 18. A pressure relief valve 18a is provided on tank 18 to prevent excessive pressure build up in that closed system We will now describe the operation of this system with reference to FIGS. 1 and 4. For purposes of this description, we will assume that the diesel engine served by the system has just been started so that hot engine exhaust gases are flowing through pipe 22 and cold intake air is flowing into pipe 48 leading to passageway 46 in unit 10. We will also assume that the storage material M is already wetted with water from tank 18 and that valves 72 and 82 are in their open positions.

To start the dehydration reaction, valve 72 is closed. This may be done by the operator or automatically by a timer after the engine has been running for a few minutes. This marks the beginning of Step 1 in FIG. 4.

During continued operation of the engine during Step 1, the thermal energy from the engine exhaust gases is transferred by the exhaust stage heat exchanger 12 to chamber 38 and it vaporizes the moisture content of the storage material M, the vapor collecting at the top of chamber 38. There is a pressure buildup in chamber 38 which drives off the water vapor through pipe 76 to the elevated tank 18 where it eventually condenses to liquid water W which remains in the tank.

Figure 5A:
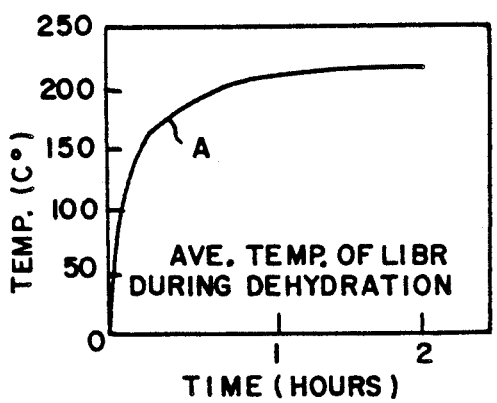
FIGS. 3 to 6 are diagrammatic views which help to explain the operation of the FIG. 1 system.
Figure 5B:
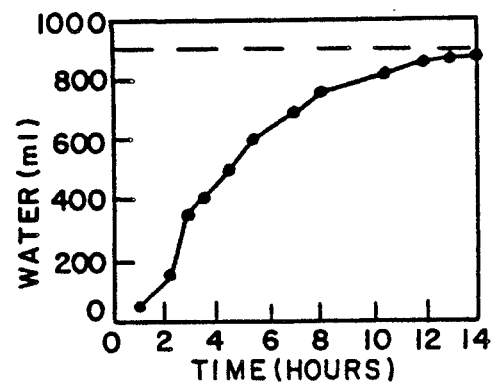

Refer for a moment to FIG. 5A. The curve A therein represents the average temperature of the storage material (LiBr) in chamber 38 during this dehydration Step 1 in an actual system. As shown by that curve there, at the beginning of Step 1, there is a rapid rise in the temperature of the storage material M. Then, as the water in chamber 38 begins to boil, the temperature of the storage material and water mixture rises more slowly until a steady state temperature is reached after about 2 hours. The curve in FIG. 5B shows that dehydration progresses rapidly at first but slows as the process proceeds over the 2 hour time period. The dashed line in FIG. 5B represents the total amount of water contained in the storage material M at the beginning of Step 1. It is estimated that under actual operating conditions, the storage material 42M in chamber 38 would be completely dehydrated in less than two hours.

After the prescribed period during which material M will have been dehydrated completely, valve 82 is closed by an engine operation timer or other suitable means so that no moisture can enter or leave chamber 38, i.e. valve 72 is still closed. The engine can now be turned off commencing Step 2 in FIG. 4 with chamber 38 and the storage material 42 therein allowed to cool to ambient temperature. For the entire duration of Step 2, the thermal energy from the engine exhaust gases is stored as a chemical potential in material 42. The system can remain substantially indefinitely at room temperature in this condition so long as moisture is excluded from chamber 38.

Figure 4:
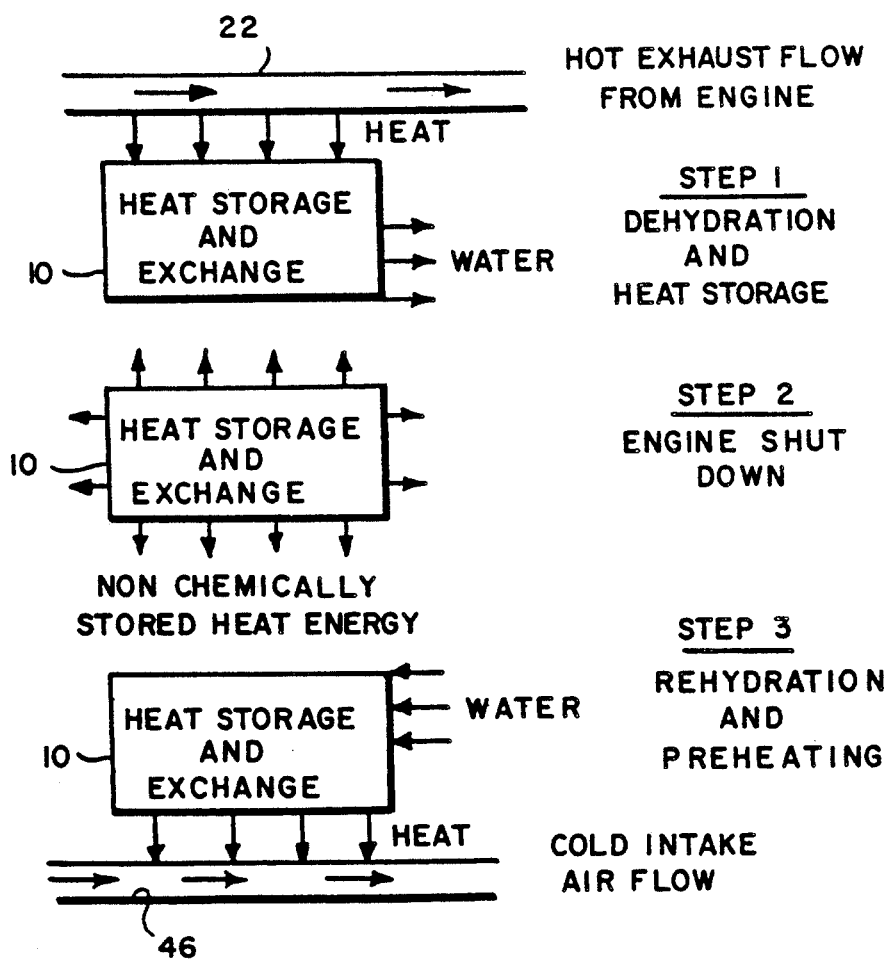

When it is desired to start the associated engine from a cold start, prior to cranking the engine, valves 72 and 82 are opened by an operator actuated control to commence Step 3 in FIG. 4. As soon as the valve 72 opens, water W flows by gravity from tank 18 into the perforated pipes 62 of preheater unit 10 whereupon the water quickly and completely permeates the thermal storage material 42M in chamber 38. Valve 82 is opened, as well as valve 72, to prevent vacuum buildup in tank 18 due to the draining water W. As soon as the storage material is wetted by the water, hydration of the storage material results in the immediate conversion of the potential energy in the storage material to thermal energy. This heat is transferred by the intake air heat exchanger 14 to the intake air flowing along passageway 46. That heated air is then conveyed by pipe 56 to the air intake port of the associated engine.

There is an optimum amount of water that should be used to rehydrate a specific amount of storage material M. Less water than the optimum would not sufficiently hydrate the material, and more than the optimum amount would result in heat loss to raise the temperature of the excess water. We have found that the optimum amount of water that should be added to a lithium bromide storage material 42M is in the order of 47% by weight of the rehydrated mixture. The above-described zeolites, on the other hand, should be rehydrated to about 25-30% by weight of the rehydrated mixture.

Figure 6:
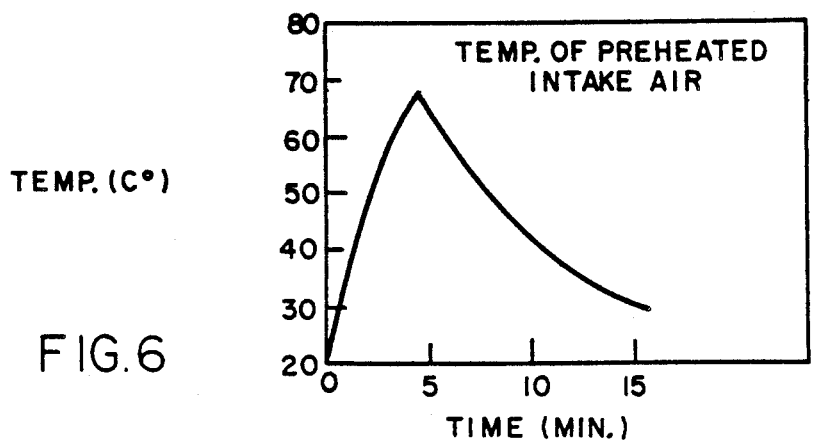

FIG. 6 shows the temperature of the air in plenum 54 at the exit end of the preheater unit 10 during Step 3. As seen there, using lithium bromide storage material, the air temperature rises steadily from the ambient air temperature (20° C.) at the entrance end of unit 10 to about 70° C. in about 5 minutes and after cranking commences, the temperature tails off in about 10 minutes. Thus, FIG. 6 shows that lithium bromide storage material, when rehydrated, can quickly raise the temperature of engine intake air by a significant amount for a length of time sufficient to cold start a diesel engine.

During the rehydration and preheating Step 3, the associated engine presumably did start so that hot engine exhaust gases again flow in pipe 22. At the end of Step 3 whose duration can be set by a suitable timer, the storage material 42 in chamber 38 is completely rehydrated. At this point then, valve 72 can be closed to ready the system for another cycle of operation at Step 1 in FIG. 4.

As is apparent from the foregoing, then, our engine preheater system which employs the hydration-dehydration cycle of lithium bromide or other similar material to store thermal energy derived from engine exhaust flow as a chemical potential in the material has many advantages over the prior preheating systems discussed at the outset. Our system is small and compact. It is completely self-contained. It emits no noxious fumes or reaction products and it is quite compact and easy to install on existing vehicles and equipment. Furthermore, the system requires no external energy source and it can store potential energy at ambient temperatures without insulation substantially indefinitely.

It will thus be seen that the objects set forth above, among those made apparent from the preceding description, are efficiently attained and, since certain changes may be made in carrying out the above process and in the construction set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described.

We claim:

1. A method of cold starting an engine comprising the steps of forming a closed system including a thermally conductive chamber containing thermal heat exchange material of the type that undergoes a reversible dehydration/rehydration cycle, a container and a pair of conduits leading from the chamber to the top and bottom of the container, respectively;

conducting hot engine exhaust gases into intimate heat exchange relation with the chamber to dehydrate said thermal storage material therein with the dehydration vapor being conducted to and condensing as liquid water in said container;

sealing said chamber and its contents from external moisture;

releasing the water in the container to said chamber so that the water permeates and hydrates the thermal storage material therein evolving thermal energy in the process; and conducting engine intake air into intimate heat exchange relation with said chamber so as to preheat that air prior to its entering the engine.

2. A method of cold starting an engine comprising the steps of
- forming a closed system including a thermally conductive chamber containing thermal heat exchange material of the type that undergoes a reversible dehydration/rehydration cycle, a container and a pair of conduits leading from the chamber to upper and lower spaces in said container, respectively;
- conducting hot engine exhaust gases into intimate heat exchange relation with the chamber to dehydrate said thermal storage material therein with the dehydration vapor being conducted to and condensing as liquid water in said container lower space;
- sealing said chamber and its contents from external moisture;
- releasing the water in said container to said chamber so that the water permeates and hydrates the thermal storage material therein evolving thermal energy in the process; and
- conducting fluid for said engine into intimate heat exchange relation with said chamber so as to heat that fluid for delivery to the engine.

3. The method defined in claim 2 including the step of selecting lithium bromide as said thermal storage material.

4. A cold start system for an internal combustion engine comprising
- a thermally conductive chamber;
- an heat exchange material of the type that undergoes a reversible dehydration/rehydration cycle contained in said chamber;
- a fluid container having an upper space and a lower space;
- means for conducting hot engine exhaust gases into intimate heat exchange relation with said chamber to dehydrate said thermal storage material therein;
- a first conduit for conducting dehydration vapor from said chamber to said container for condensing in the container lower space;
- means for sealing said chamber and its contents from external moisture;
- a second conduit for conducting water in said container lower space to said chamber for hydrating the thermal storage material therein to evolve thermal energy to heat the chamber, and
- means for circulating fluid for said engine into intimate heat exchange relation with said chamber as to heat said fluid for delivery to said engine.

5. The system defined in claim 4 including
- a first tube and a first set of heat exchange fins projecting out radially from the first tube;
- a second larger diameter tube coaxial to and surrounding said first tube and said first set of fins and a second set of heat exchange fins projecting out radially from the second tube;
- a third still larger diameter tube coaxial to and surrounding said second tube and said second set of fins, and
- closure means for closing the ends of said second tube, said first tube constituting said first conducting means, the space between said first and second tubes and said closure means constituting said chamber and the clearance between said second and third tubes providing said second conducting means.

6. The system defined in claim 4 wherein said thermal storage material is a salt which dehydrates at a temperature less than 350° C.

7. The system defined in claim 2 wherein said thermal storage material is lithium bromide.

8. The system defined in claim 4 wherein said thermal storage material is an adsorbent whose bonds with a water absorbate will break at a temperature less than 350° C.

9. The system defined in claim 4 wherein said thermal storage material is a zeolite.

10. The system defined in claim 4 wherein said chamber and said first and second conduits are all coaxial.

11. The system defined in claim 10 wherein said first fluid conduit extends through said chamber and said chamber is located within said second conduit.

12. The system defined in claim 4 wherein said container is located physically above said chamber.

* * * * *